(No Model.)

W. G. DOUGLAS.
CASH REGISTER AND INDICATOR.

No. 473,172. Patented Apr. 19, 1892.

Witnesses:
W. C. Jirdinston.
E. W. Hardinghaus

Inventor:
Wm. G. Douglas
by Paek & Rector
Attorneys.

UNITED STATES PATENT OFFICE.

WILLIAM G. DOUGLAS, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 473,172, dated April 19, 1892.

Application filed February 8, 1892. Serial No. 420,689. (No model.)

*To all whom it may concern:*

Be it known that I, WILLIAM G. DOUGLAS, a citizen of the United States, residing at Dayton, in the county of Montgomery and State of Ohio, have invented certain new and useful Improvements in Cash Registers and Indicators, of which the following is a description, reference being had to the accompanying drawings, forming part of this specification.

My invention relates to the indicating mechanism of such machines, and its novelty will be herein set forth, and particularly pointed out in the claims.

Figure 1:
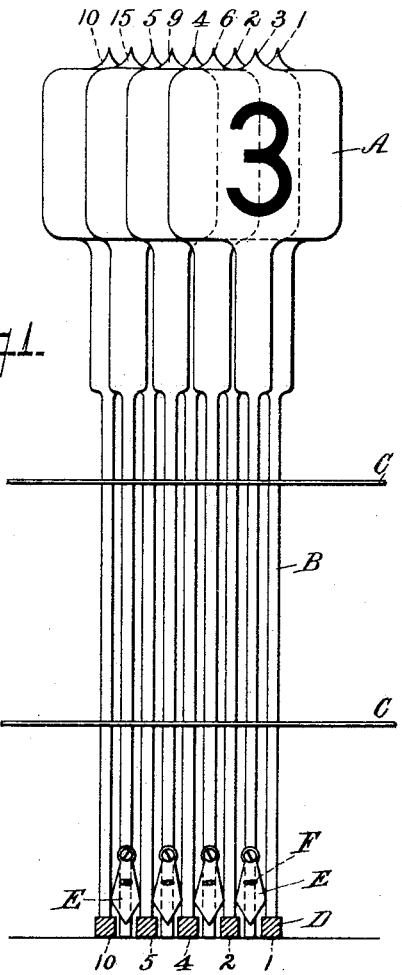
Figure 2:
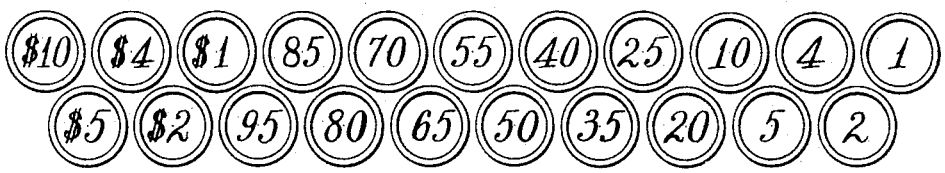

In the accompanying drawings, Figure 1 is a front elevation of a group of indicators and their supporting-rods, sections of the keys by which they are operated being shown at their lower ends. Fig. 2 is a plan view of the "keyboard" or series of numbered key-buttons of a cash-register.

In machines of this class each key has heretofore generally been made to operate but one indicator, such indicator bearing a number corresponding to the value of the key and being moved into view by the operation of the key. In such case it was necessary to have a separate key and separate indicator for each amount to be indicated and registered, or else two or more keys and two or more indicators had to be simultaneously operated to indicate those amounts which could not be indicated by the operations of single keys. The objection to this latter course is that it is not only often confusing to have two indicators exposed at once; but where they are adjacent and overlap each other (as adjacent indicators generally do in the ordinary cash-register) the two numbers cannot be clearly exposed.

My invention consists in combining a third indicator with each two keys, which are to be operated together to indicate the sum of their values, such third indicator bearing a number indicating the sum of such values, and being so combined with the two keys that the operation of either key singly will expose simply its own individual indicator, while the operation of the two keys together will expose the third indicator, exhibiting the sum of their values. Thus with the one-cent key and its indicator and the two-cent key and its indicator I combine a third indicator to indicate three cents, such third indicator being so combined with the one-cent and two-cent keys that the operation of both together will expose the three-cent indicator and hide the one-cent and two-cent indicators, while the operation of either key alone will expose only its individual indicator. With the two-cent and four-cent indicators I combine a six-cent indicator, with the four-cent and five-cent indicators a nine-cent indicator, with the five and ten-cent indicators a fifteen-cent indicator, and so on, as hereinafter described, the result being that with a given number of keys in a machine I am enabled to make with single indicators almost double the number of indications that are possible with single indicators, where each key actuates only one indicator.

In Fig. 1 of the accompanying drawings I have shown one method of combining these third or auxiliary indicators with the keys and indicators whose combined values they are to represent. As there illustrated the indicators A are supported upon vertical rods B, mounted in guides C C, as usual in this class of machines. Nine indicators and their supporting-rods are shown. The rods of five of these, representing, respectively, one, two, four, five, and ten cents, rest at their lower ends upon the rear ends of the operating-keys D, cross-sections of five of which are shown in Fig. 1. The front ends of these keys may be assumed to bear buttons corresponding to the five buttons on the right in Fig. 2, and when any key is operated its corresponding indicator is lifted and exposed to view at the usual reading-opening in the casing of the machine.

The rods of the other four indicators, which represent, respectively, three, six, nine, and fifteen cents, are arranged as follows: that of the three-cent indicator between those of the one-cent and two-cent indicators, that of the six-cent indicator between those of the two-cent and four-cent indicators, that of the nine-cent indicator between those of the four-cent and five-cent indicators, and that of the fifteen-cent indicator between those of the five-cent and ten-cent indicators. The rods of these auxiliary indicators stand slightly in front of the row of the rods of the individual indicators, and the auxiliary indicators stand in front of the respective individual indicators whose combined values they represent. The rods of these auxiliary indicators may be supported in any suitable manner. In the drawings the lower ends are shown extending down between the keys and resting on the same support as the rear ends of the keys. Pivoted to the front side of each of them, near its lower end, is a pendent plate E, capable of swinging from side to side and whose range of movement may be limited by a pin F, projecting from the rod through a slot in the plate. The lower ends of the plates are preferably beveled off to a point, and they are wider at their widest portion than the space between the two adjacent keys D. The result of this arrangement is that when any single key is operated the adjacent plates E are swung aside and the rods carrying the plates are not moved, while the rod resting upon the key is lifted and its individual indicator exposed to view. When two adjacent keys are operated at once, however, they pick up the intermediate plate E and lift the rod to which it is pivoted and expose its indicator to view. The individual indicators belonging to the operated keys are also lifted; but as they are behind the auxiliary indicator they are hidden from view, the auxiliary indicators preferably being made somewhat wider than the others for this purpose.

In Fig. 2 I have shown the keyboard of a cash-register containing twenty-one keys to illustrate how my invention may be carried out in such a machine. It may be there assumed that the adjacent keys are all combined with intermediate auxilliary indicators in the manner shown in Fig. 1, each key also having its individual indicator. By such combination I am enabled to indicate upon single indicators the following forty-one numbers: "1," "2," "3," "4," "5," "6," "9," and "10;" the seventeen multiples of five from "15" to "95," inclusive; and "$1," "$1.05," "$1.20," "$1.35," "$1.50," "$1.65," "$1.80," "$1.95," "$2," "$3," "$4," "$5," "$6," "$9," "$10," and "$15." To indicate these numbers under the old arrangement without exposing two separate indicators for part of them would have required forty-one keys in the machine, while under my new arrangement only twenty-one are necessary.

While I have shown and described the auxiliary indicators as being combined with the keys and individual indicators by means of the plates E, pivoted to the rods of the auxiliary indicators and co-operating with the keys, yet I do not wish to be restricted to the employment of such plates, nor where they are used to the particular arrangement of them shown. For instance, they might be pivoted higher up on the rods and be arranged to co-operate with lugs upon the forward sides of the individual indicator-rods, much as they now co-operate with the keys; but my invention is not restricted to reciprocating indicators supported upon vertical rods, as shown, but is applicable to other well-known forms of indicators supported and operating in different ways. It contemplates, broadly, the combination of two keys or other actuating devices of an indicating-machine, with an indicator representing the sum of their values and moved into view by their joint operation, but remaining stationary when either key is operated alone; also, the combination, in any form, of two independently-movable indicators bearing indicating-numbers and their operating-keys or other actuating devices, with a third indicator bearing a number representing the sum of the numbers upon the other two and arranged to be brought into view by their joint operation and to remain hidden when either one of them is operated alone.

Having thus fully described my invention, I claim—

1. In an indicating-machine, the combination, with two operating-keys or actuating devices, of an indicator representing the sum of their values and arranged to be moved into view by their joint operation, but to remain stationary upon the operation of either key alone.

2. In an indicating-machine, the combination, with two independently-movable indicators bearing indicating-numbers and their operating-keys or actuating devices, of a third indicator bearing a number representing the sum of the numbers upon the other two and arranged to be exposed to view by their joint operation, but to remain unexposed when only one of them is operated.

3. In an indicating-machine, the combination of two adjacent keys D, representing different values, the intermediate rod B, carrying an indicator A, representing the sum of their values, and a plate E, carried by and movable upon the rod B and co-operating with the keys D in the manner described.

4. In an indicating-machine, the combination of two adjacent keys D, representing different values, two indicators A, representing the respective values of said keys and carried by rods B, lifted by the keys, a third indicator representing the sum of the values of the two keys and carried by a rod intermediate the two keys, and a plate E, pivoted to said third rod and co-operating with the two keys, in the manner described.

WILLIAM G. DOUGLAS.

Witnesses:
THOMAS CORWIN,
PEARL N. SIGLER.